March 12, 1963    L. G. HALL ETAL    3,081,250
ELECTRODE STRUCTURE
Filed Feb. 24, 1958    5 Sheets-Sheet 1
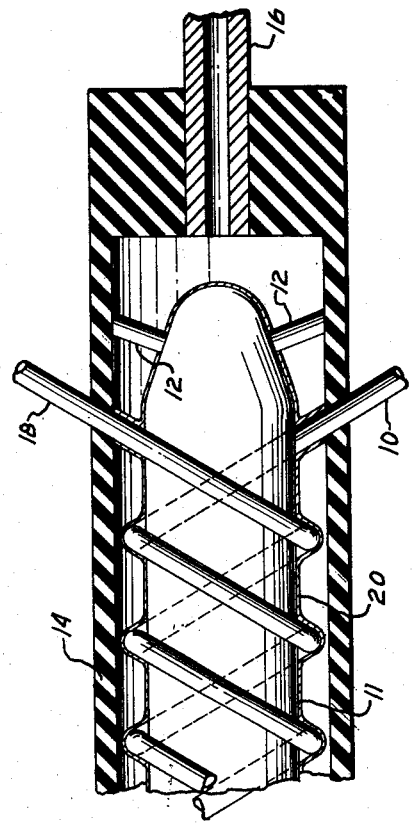
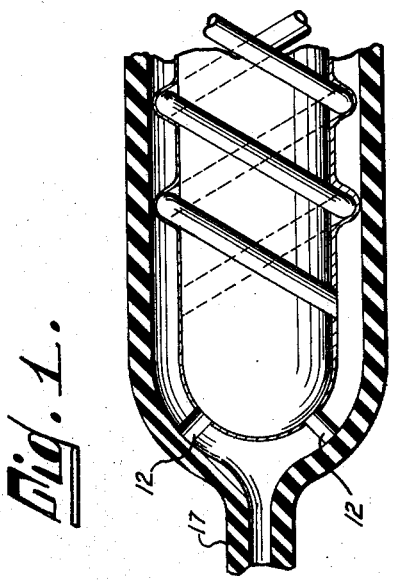
INVENTORS
LAWRENCE G. HALL
LELAND G. COLE
CLIFFORD E. BERRY
BY
Christie, Parker & Hale
ATTORNEYS

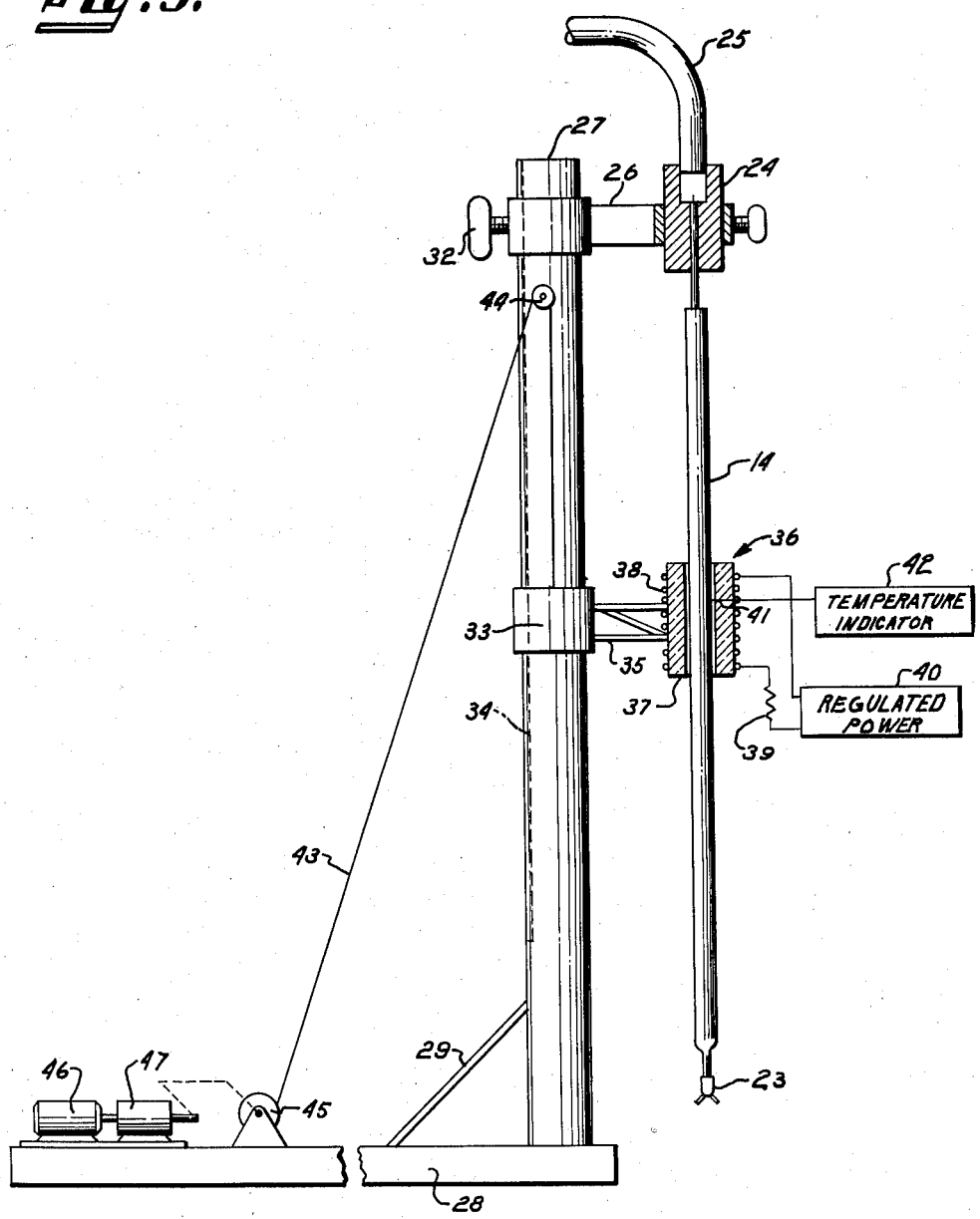

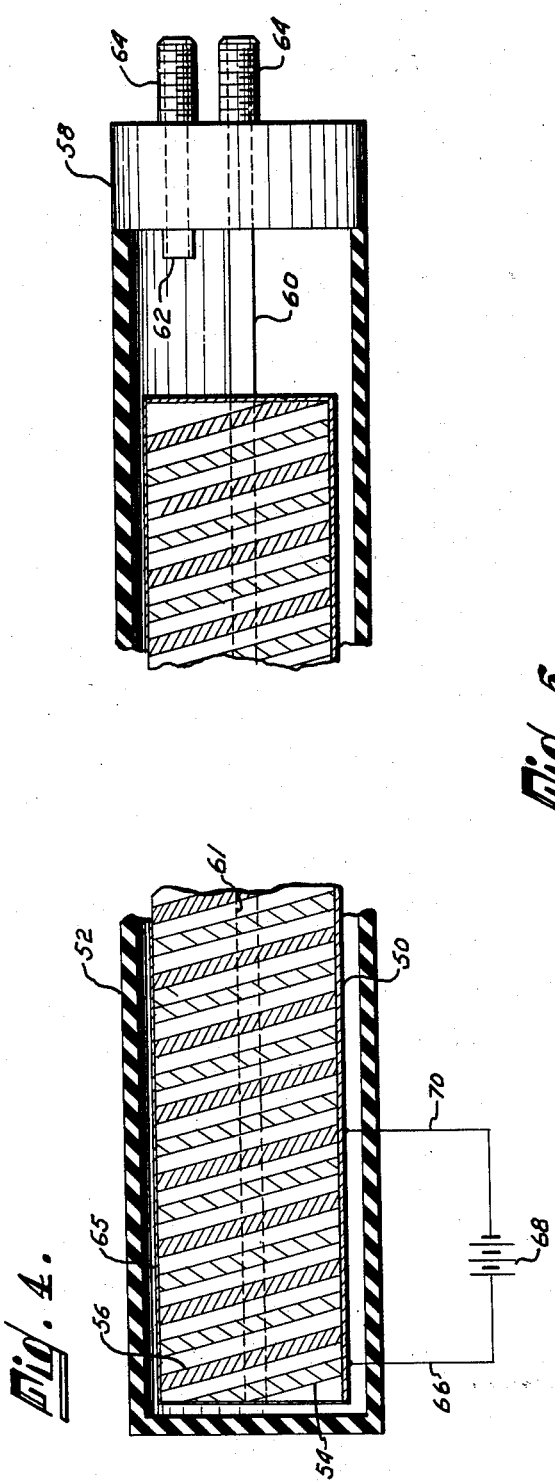
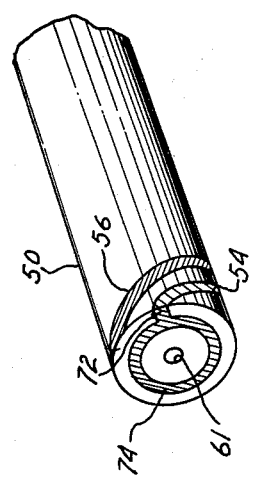

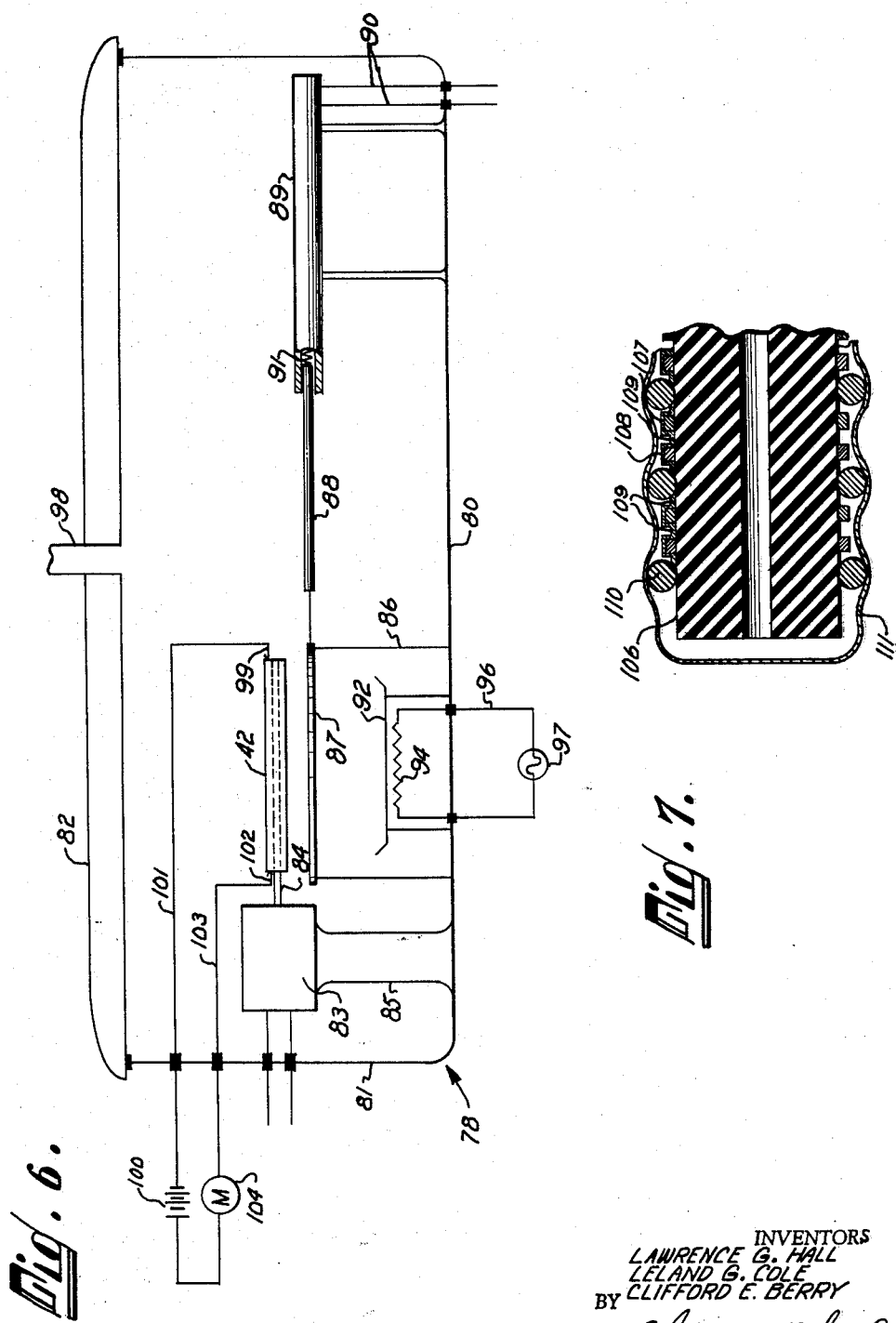

March 12, 1963
L. G. HALL ETAL
3,081,250
ELECTRODE STRUCTURE
Filed Feb. 24, 1958
5 Sheets-Sheet 5
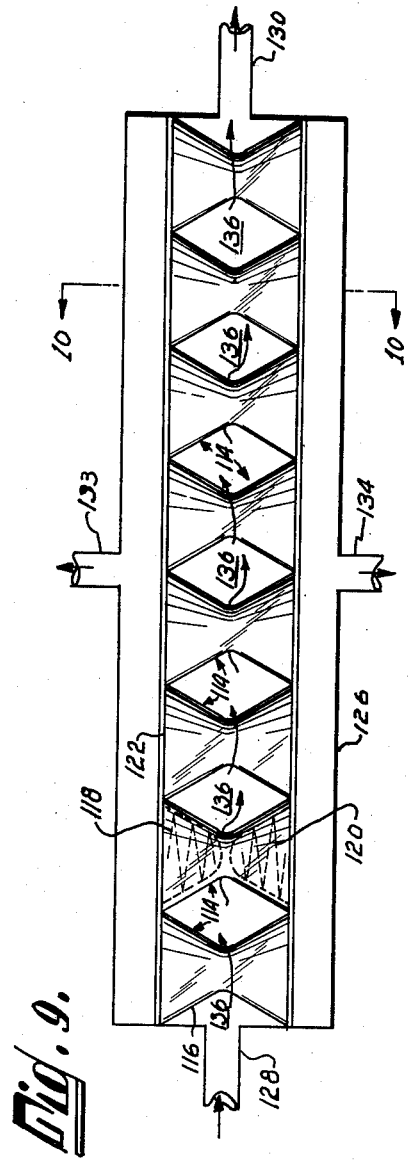
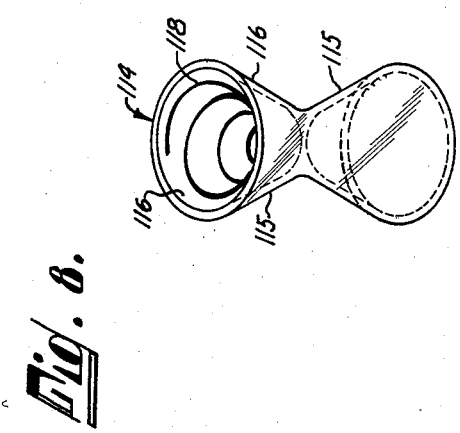
INVENTORS
LAWRENCE G. HALL
LELAND G. COLE
BY CLIFFORD E. BERRY
Christie, Parker & Hale
ATTORNEYS

United States Patent Office 3,081,250
Patented Mar. 12, 1963

3,081,250
ELECTRODE STRUCTURE
Lawrence G. Hall, West Covina, Leland G. Cole, Arcadia, and Clifford E. Berry, Altadena, Calif., assignors, by mesne assignments, to Consolidated Electrodynamics Corporation, Pasadena, Calif., a corporation of California
Filed Feb. 24, 1958, Ser. No. 717,038
3 Claims. (Cl. 204—195)

This invention relates to an improved electrode structure, and is particularly useful in electrolytic cells and the like.

Cells currently finding use in commercial moisture analyzers are illustrative of one type of electrolytic cell, and the invention is described as applied to an electrolytic moisture analyzer. A typical cell comprises a pair of spaced conductive wire electrode coils wound with individual turns of one coil disposed between adjacent turns of the other coil, the coils being supported against the interior of an enclosing tube or housing. A film of a hygroscopic electrolyte, such as phosphorous pentoxide, is deposited on the coils and housing interior to bridge the space between adjacent turns of the two wire helixes.

One electrode coil is connected to the positive terminal of a direct current source of power, and the other coil is connected to the negative terminal of the power source. When the electrolyte is conductive, say upon absorption of moisture, an electrolytic cell exists between the alternately spaced turns of the electrode coils. In operation, therefore, as moisture is absorbed by the electrolyte from a fluid stream flowing past the coils, the electrolyte becomes conductive, current flows between the coils in the regions of conductivity and the water is electrolyzed to hydrogen and oxygen, which diffuses from the electrolyte as gas. The electrolyte is thereby continuously regenerated and the electrical energy consumed is an accurate measure of the moisture absorption in accordance with Faraday's laws.

Heretofore, cells of this type have been made by winding the electrode coils so they are held in the desired position by supporting coils or cores which were dissolved out after the two electrode coils were secured to the housing interior. This procedure has the disadvantage of requiring a time consuming dissolving operation to remove the supporting and spacing material for the electrode coils.

In the past, the electrolytic film was deposited from a liquid solution by coating and drying as many times as required to build up the desired amount of electrolyte. However, this procedure sometimes resulted in non-uniform deposition of electrolyte due to variations in wettability of the electrodes, and other difficulties inherent in depositing a material from a liquid solution. In addition, the coating and drying operation, particularly if repeated applications were required, resulted in increased manufacturing time.

This invention provides an improved electrode structure which eliminates the step of dissolving a supporting material from the coils, and in the preferred form also eliminates deposition of the electrolyte from a liquid, resulting in a further reduction of manufacturing time. Moreover, the sample flows between the housing and the peripheries of the coils, thereby substantially reducing the linear velocity of the sample without decreasing its throughput below that achieved with the prior electrolytic cells.

In terms of apparatus, the invention contemplates an electrode structure which includes a core member with first and second electrical conductors on it, the two conductors being spaced from each other. A housing is disposed around the core and the conductors, and spaced from the core to leave a space for a sample between the core and the housing.

In one presently preferred form of the invention, the conductors are on the core in the form of intermeshing coils so each turn of one coil lies between adjacent turns of the other coil. Also, an electrolyte film, such as phosphorous pentoxide, is deposited in a portion of the space between the core and housing to form a mechanical and electrical bridge between adjacent turns of the coils.

Also in a preferred form of the invention, the conductors are deposited on the core from a vapor phase, and the electrolyte film is similarly deposited in the space between the housing and core.

In terms of method, the invention contemplates making an electrode structure by depositing a pair of spaced electrical conductors on a core member, and vapor coating the core and conductors with an electrolyte film. In the preferred form of the invention, the electrodes are formed by coating the core member with a conductive metal and then cutting a pair of parallel spiral grooves through the conductive coating to form a pair of intermeshing conductive electrode coils. Thereafter, the electrolyte film is deposited on the core and the conductive electrodes to bridge adjacent turns of the electrode coils.

These and other aspects of the invention will be more fully understood from the following detailed description taken in conjunction with the accompanying drawings in which:

FIG. 1 is a schematic sectional elevation of one embodiment of the invention;

FIG. 2 is a fragmentary sectional elevation of an alternate embodiment of the invention;

FIG. 3 is a schematic elevation of apparatus for making the embodiment of the invention shown in FIG. 2;

FIG. 4 is a schematic sectional elevation of another form of the invention;

FIG. 5 is a fragmentary perspective view taken at the left hand end of the electrode structure shown in FIG. 4;

FIG. 6 is a schematic sectional elevation of apparatus for making the electrode structure shown in FIG. 4;

FIG. 7 is a schematic sectional elevation of an alternate embodiment of the electrode structure shown in FIGS. 4 and 5;

FIG. 8 is a perspective view of an electrode structure adapted to be used in an electrolytic cell in which the decomposition products of the electrolysis are separately collected and separated from a fluid stream;

FIG. 9 is a schematic sectional view of a plurality of the electrode structures of FIG. 8 stacked to form an electrolytic cell; and FIG. 10 is a view taken on line 10—10 of FIG. 9.

Referring to FIG. 1, a first electrode coil conductor or wire 10 is wound in the form of a helical spiral around a solid cylindrical core member 11, which preferably is of an insulating material such as pyrex glass or a non-hygroscopic plastic. The core is supported at each end by spider arms 12 coaxially within a cylindrical housing or tube 14, which has an inlet 16 and an outlet 17 at its right and left ends respectively (as viewed in FIG. 1).

Preferably, the housing is made of an insulating material similar to or identical with that of the core. The right hand end of the first electrode coil is sealed through the housing wall and the left hand end of the first coil terminates at the left hand end of the core. A second electrode coil or wire 18, whose right hand end is sealed through the wall of the right hand end of the housing, is wound in the form of a helical spiral on the core member, and its left hand end terminates at the left hand end of the core member. The individual turns of the second electrode coil are disposed between and spaced from adjacent turns of the first electrode coil.

An electrolyte film 20, say of phosphorous pentoxide, is on the core and coils to form a mechanical and electrical bridge between adjacent turns. Any other suitable electrolyte or dielectric film material may be used, depending on the application of the electrode cell. For example, if a sample is to be analyzed for water by electrolytic decomposition, dried sodium hydroxide and potassium hydroxide films may be used. The electrolyte film of FIG. 1 may be deposited by dipping the core and coils in a water solution (not shown) of phosphoric acid with repeated drying and dipping until the required amount of phosphorous pentoxide film is built up. However, the film preferably is deposited from a vapor phase as described below.

In using the electrode structure of FIG. 1 as an electrolytic cell to detect water, one electrode coil is connected to the positive terminal of a D.C. power source (not shown) and the other electrode coil is connected to the negative terminal. A sample containing moisture is passed over the outer portion of the coils in the annular space between the core and the housing. The moisture present in the sample is adsorbed by the electrolyte film, which then becomes conductive. The flow of electric current through the film electrolytically decomposes the water vapor into hydrogen and oxygen gas, so that the adsorption and decomposition process is continuous, and the electrolyte film is thereby continuously regenerated. If the amount of moisture present in the sample is to be measured, suitable measuring and recording instruments (not shown) are included in the circuit.

An alternate embodiment of the electrode structure of FIG. 1 is shown in FIG. 2. The two electrode coils are embedded in the opposing surfaces of the housing and core so that the housing and core extend part way into the space between adjacent turns of the electrode coils. In addition to the first electrolyte film 20 on the core and coils, a second electrolyte film 22 is deposited on the coils and the interior surface of the housing between adjacent turns to make an electrical and mechanical bridge across adjacent turns. The two electrolyte films 20 and 22 preferably are deposited from the vapor phase as described in detail below.

In operating the apparatus of FIG. 2, the sample flows through the spiral path formed between the core, housing and adjacent turns of the coils. The advantages of the apparatus of FIG. 2 over that of FIG. 1 are: (1) The sample is forced to follow a longer path through the cell; and (2) the sample is simultaneously exposed to a second film of electrolyte, resulting in reduced response time to changes in moisture content of the sample.

FIG. 3 shows apparatus for forming the electrolytic cell of FIG. 2. Prior to deposition of the electrolyte films, the electrode structure of FIG. 1 is held in a vertical position with its outlet end below the inlet end. The outlet end of the cell is sealed by a cap 23, and the other end is connected by a coupling 24 to a tube 25, which is connected to a vacuum source (not shown). The electrode cell is supported by a vertically slidable clamp 26 mounted on a post 27, which is supported from a base 28 and reinforced by one or more braces 29. The electrode cell is held in a fixed position by locking the clamp to the post with a finger nut 32.

A vertically slidable carriage 33 mounted on the post is keyed against a rotation into a keyway 34 in a conventional fashion. The carriage, by means of a framework 35, supports a tubular heater 36 which surrounds the housing, and travels up and down the cell in response to the vertical movement of the carriage. The heater may be of any suitable type, such as an induction, dielectric, or radiant type heater. The heater shown in FIG. 3 is a radiant type which includes a tubular core 37 made of a suitable refractory material, such as steatite with a heating coil 38 wrapped on its circumference. The heating coil is connected through a variable resistor or rheostat 39 across a regulated power supply 40. A thermocouple 41 is supported around the inside circumference of the heater core and is connected in a conventional manner to the temperature indicator 42.

A cable 43 is connected at one end to the carriage and carried over a pulley or slip ring 44 at the upper portion of the post, and extends downwardly where it is wound on a capstan 45 supported on the base. An electric motor 46 is connected through a suitable gear box 47 to drive the capstan at a predetermined speed to raise the carriage and heater from the extreme lower position slowly upwardly around the length of the electrolytic cell.

While the heater is caused to travel around the length of the electrolytic cell, a partial vacuum is maintained within the housing by reason of its connection with the vacuum source, which may be any conventional mechanical pump (not shown). The effect of the pressure difference between the exterior and interior of the tube coupled with the localized heating to a temperature above the softening point of the core and the housing produces a deformation as shown in FIG. 2. Care is taken to avoid excessive softening or pressure differentials so the space between the housing and core is not closed. The deformation of the housing is so uniform as a result of the conditions inducing it that it retains a nearly perfect cylindrical exterior configuration even after its reduction in diameter. By way of example, if pyrex glass and a radiant type heater are used, suitable softening is obtained by maintaining the temperature at the thermocouple of about 850° C.

After the cell is shaped as shown in FIG. 2, vaporized phosphorous pentoxide is passed through the spiral path formed between the coils and the walls of the core and housing. The phosphorous pentoxide vapor deposits on the electrode coils and the exposed walls of the housing and core to form the electrolyte films 20 and 22 shown in FIG. 2.

Referring to FIG. 4, a cylindrical core 50 which preferably is a capillary tube, is coaxially disposed within a cylindrical housing or tubing 52. First and second electrode coils 54 and 56, respectively, in the form of helical spirals are deposited on the outer surface of the capillary tube. The left hand end (as viewed in FIG. 4) of the housing is closed, and a closure 58 is in the right hand end of the tube. The closure includes a relatively long conduit 60 which extends into the bore 61 of the capillary tube and is bonded to the tube. A relatively short conduit 62 extends through the closure and opens into the housing. Each of the bores has outlet tubes 64 to permit the entrance and exit of a fluid sample. An electrolyte film 65 is deposited on the core and coils to form a mechanical and electrical bridge across adjacent turns of the electrode coils.

The first electrode coil is connected to an anode 66 of a D.C. power source 68, and the other electrode coil is connected to the cathode 70 of the D.C. power source.

In the operation of the electrode cell of FIG. 4, the sample flows in through the relatively short conduit 62 and passes through the annular space between the core and housing. Water vapor in the sample is sorbed by the electrolyte film, and decomposed electrolytically as described above. The sample then enters the left end of the capillary bore and leaves the electrolytic cell through the long conduit 60.

FIG. 5 shows in perspective the disposition of the two electrode coils at the left end of the capillary tube or core. The left hand end of the first electrode coil 54 is connected by a radial conductor 72 to a circular conductor 74 on the left end of the capillary tube. The second electrode coil 56 terminates at the left end of the capillary tube. At the right end of the capillary tube (not shown) the end of the second coil 56 is connected by a radial conductor (not shown) to a circular conductor (not shown) on the right hand end of the capillary tube. The first electrode coil 54 terminates at the right end of the capillary tube. The purpose of this electrode arrangement is described in the following paragraph in connection with the apparatus of FIG. 6, which shows how the electrolyte film of FIG. 4 is deposited on the capillary tube and electrode coils.

Referring to FIG. 6, a vacuum chamber 78 includes a circular bottom 80 with an annular peripheral side wall 81. The top of the vacuum chamber is closed by a cover 82. An electric motor 83 with a horizontal mandrel 84 is mounted on a vertical bracket 85 at the left hand end (as viewed in FIG. 6) of the vacuum chamber. Power leads for the motor are sealed through the side wall of the vacuum chamber. The capillary tube 50 prior to deposition of the electrode coils and assembly in its housing is mounted on the mandrel 84 so that it can be rotated about a horizontal axis over an upright cylindrical evaporation compartment 86 which is covered at its upper end by a circular baffle 87 adapted to be moved laterally by a solenoid plunger 88 which fits in a solenoid coil 89. Electric leads 90, sealed through the bottom of the vacuum chamber, connect the solenoid coil to a suitable source of power (not shown). A compression spring 91 urges the solenoid to the left (as viewed in FIG. 6) when the solenoid is de-energized, so the baffle is normally over the evaporation compartment, which contains an evaporation boat 92 and a heater 94 supplied power by leads 96 sealed through the bottom of the vacuum chamber and connected to a power source 97. A conduit 98 in the top of the vacuum chamber cover is adapted to be connected to a vacuum source (not shown) so the pressure in the vacuum chamber can be sufficiently reduced to permit vapor coating of the capillary tube.

The evaporation boat is loaded with aluminum, or other suitable electrode material, the evaporation compartment covered by the baffle, and the vacuum chamber evacuated. After the pressure is sufficiently low, the heater is turned on to vaporize the aluminum, the motor turned on to rotate the capillary tube, and the solenoid coil energized to uncover the evaporation compartment so a coating of aluminum is deposited on the capillary tube over its entire surface, including the ends. The thickness of the aluminum coating can be any suitable amount, say .125 mm. After deposition of the aluminum coating, the heater is turned off, the evaporation compartment covered, and the pressure in the vacuum chamber returned to atmospheric. The cover is then removed and the capillary tube taken from the mandrel. The coated tube is then put on a lathe (not shown) and two parallel spring-loaded cutting tools (not shown) are set about .005 inch apart to cut away all the electrode material in two narrow, say .005 inch, low pitch spirals for the entire length of the capillary tube. The electrode material on the ends of the capillary tube are finished to form the radial and circular conductors described in connection with FIG. 5.

The capillary tube with its two electrode coils is then returned to the vacuum chamber in the position shown in FIG. 6. A first spring loaded contact or commutator 99 is connected to a source of electrical power 100 by a lead 101 sealed through the side wall of the vacuum chamber, and is placed in sliding contact with the circular turn of the second electrode coil 56 at the right hand end of the capillary tube. A second spring loaded contact or commutator 102 is placed in contact with the circular conductor 74 at the left hand end of the capillary tube. The second commutator 102 is connected by a lead 103 to the source of power to which lead 101 is connected. A meter 104 is in the circuit.

The evaporation boat is loaded with phosphorous pentoxide, or other suitable electrolyte, and the cover is placed on the vacuum chamber. The pressure in the vacuum chamber is reduced. The heater is turned on to raise the temperature of the phosphorous pentoxide above its normal sublimation point of 347° C. After the phosphorous pentoxide is being vaporized at a stable rate, the solenoid is energized to remove the baffle from the evaporation compartment 86. The electrode coils and capillary tube, which is turned at a uniform rate by the electric motor 83, is coated with a uniform film of phosphorous pentoxide. The final thickness of the phosphorous pentoxide coating is determined by observing the inter-electrode resistance, which is indicated by readings on the meter 104. Once the desired coating is applied, the solenoid is de-energized so the evaporation compartment is covered, and the electric motor and heater are turned off. The pressure in the vacuum chamber is returned to atmospheric and the cover is removed from the vacuum chamber. The capillary tube is taken from the mandrel and installed in the housing 52 as shown in FIG. 5.

FIG. 7 shows an alternate arrangement of the apparatus of FIG. 4 in which a capillary tube 106 with a first spiral electrode coil 107 and a second spiral electrode coil 108 formed and coated with an electrolytic film 109 as described above, is wrapped with a spiral nonconducting filament 110, which can be made of an electrically insulating material such as sintered Teflon, plastic, glass fiber, etc. The electrodes are connected by suitable conductors (not shown) to the opposite terminals of a source of D.C. power (not shown). The pitch of the insulating filament need not be the same as that of the electrodes, and may either be parallel to the pitch of the electrodes or can be in a reverse direction. The capillary tube is disposed in a flexible hollow cylindrical envelope or housing 111 whose I.D. is slightly exceeded by the O.D. of the electrode assembly and filamentary wrapping so that the wall of the housing makes a snug fit against the filamentary wrapping. Sample flowing through the space between the housing and capillary tube is forced to follow a spiral path around the filamentary wrapping, and then back up the capillary bore of the tube.

Referring to FIG. 8, a core member 114 made of a suitable porous dielectric material such as porcelain or sintered glass, is shaped in the form of a pair of hollow, right circular cones 115 joined at their apexes and having a common central axis. An electrolyte 116, such as phosphorous pentoxide, is disposed in the pores and on the surfaces of the core member so the core is impermeable to gases, and opposite surfaces of the core are bridged by the electrolyte. A first spiral electrode 118 is deposited on the inside of one cone portion of the core member in contact with the electrolyte, and a second spiral electrode 120 is deposited in the inside portion of the other cone portion in contact with the electrolyte. The electrolyte, as well as the electrodes, can be deposited from a vapor phase, an appropriate mask (not shown) being used for the deposition of the electrodes.

As shown in FIG. 9, a plurality of core members, each of which is generally X-shaped in cross section, are in an elongated stack with the central axes of the core members parallel to each other and perpendicular to the longitudinal axis of the elongated stack. The respective bases of the cone portions on each side of the stacked core members are covered by a separate elongated cover plate 122 which extends for the length of the stack. The cover plates have perforations 124 over the open area of each cone portion and serve a purpose described below. The stacked core members and cover plates are enclosed in an elongated housing 126 which has a fluid inlet 128 at one end and a fluid outlet 130 at its opposite end. Each cover plate extends for the entire length of the housing and is sealed against the end walls of the housing adjacent the inlet and outlet.

Referring to FIG. 10, the housing is of rectangular cross section having a pair of long side walls 131, and a pair of short side walls 132, which are parallel to the cover plates. The cover plates extend laterally so that each respective edge is sealed against the inside surface of the long side walls of the housing. A pair of lateral openings 133 and 134 in the short side walls serve as discharge openings for decomposition products. A fluid stream space 136 is formed between the exterior of the core members and the long side walls of the housing.

In the operation of the electrolytic cell shown in FIGS. 9 and 10, a fluid stream containing a material to be removed, such as water, flows in the inlet, through space 136 as indicated by arrows, and out the outlet. The material, say water, taken up by the electrolyte, is subjected to electrolysis due to a D.C. voltage source (not shown) connected by suitable means (not shown) to the respective electrodes on opposite sides of each core member. The oxygen formed by the electrolytic decomposition is released in the cone portions of the core members which contain the electrodes connected to the positive side of the D.C. source and the hydrogen formed by the electrolysis is connected in the other ends of the cores. Each of the decomposition gases passes through the perforation 124 of the side plates and out the respective lateral outlets in the housing. Thus, "wet" fluid enters the housing inlet, and "dry" fluid reaches the housing outlet. The decomposition products are continuously and separately removed from the fluid stream.

The vapor deposition technique for applying the electrolyte film has the advantage over deposition from liquid solutions of providing a coating which more uniformly covers the electrodes and supporting core. In addition, the application of the electrolyte film by deposition from the vapor phase requires substantially less time, with an attendant decrease in manufacturing time. Moreover, the relatively thin and uniform electrolyte film formed by vapor deposition results in an electrolytic cell with faster response to low, as well as high, concentrations of water vapor than electrolytic cells in which the electrolyte film is deposited from liquid solutions.

We claim:

1. An electrode structure comprising an electrically insulating core member having an external surface, a first electrical conductor on the core surface, a second electrical conductor on the core surface and spaced from the first, a housing of insulating material with an interior surface disposed around the core and conductors, the conductors being embedded in the interior surface of the housing, and a hygroscopic electrolyte film deposited on the surface of the core and the interior surface of the housing to bridge the space between the conductors on the two said surfaces.

2. Apparatus according to claim 1 in which the core member projects outwardly between adjacent conductors.

3. An electrode structure comprising an electrically insulating core member having an external surface, a first electrical conductor wound on the core surface in the form of a helix with spaced apart adjacent turns, a second electrical conductor wound on the core surface in the form of a helix with each of its turns disposed between and spaced from adjacent turns of the first conductor, a housing of insulating material with an interior surface disposed around the core and conductors, the conductors being embedded in the interior surface of the housing, and a hygroscopic electrolyte film deposited on the interior surface of the housing and the surface of the core to bridge the space between the conductors.

References Cited in the file of this patent

UNITED STATES PATENTS

| | | |
|---|---|---|
| 823,671 | Dieterich | June 19, 1906 |
| 2,026,086 | Farncomb | Dec. 31, 1935 |
| 2,501,051 | Henderson et al. | Mar. 21, 1950 |
| 2,651,612 | Haller | Sept. 8, 1953 |
| 2,706,366 | Best | Apr. 19, 1955 |
| 2,745,804 | Shaffer | May 15, 1956 |
| 2,816,067 | Keidel | Dec. 10, 1957 |
| 2,830,945 | Keidel | Apr. 15, 1958 |
| 2,934,693 | Reinecke et al. | Apr. 26, 1960 |